United States Patent
Jonsson et al.

(10) Patent No.: US 6,521,070 B2
(45) Date of Patent: Feb. 18, 2003

(54) METHOD AND EQUIPMENT FOR MIXING HARD GRANULES FOR TIRE TREADS

(76) Inventors: Olafur Jonsson, 2b Birkihlid, 220 Hafnarfjordur (IS); Helgi Geirhardsson, 8 Einilundi, 210 Gardabaer (IS)

( * ) Notice: Subject to any disclaimer, the term of this patent is extended or adjusted under 35 U.S.C. 154(b) by 0 days.

(21) Appl. No.: 09/953,440

(22) Filed: Sep. 17, 2001

(65) Prior Publication Data

US 2002/0062907 A1 May 30, 2002

Related U.S. Application Data

(63) Continuation of application No. 09/029,012, filed as application No. PCT/IS96/00005 on Aug. 15, 1996, now abandoned.

(30) Foreign Application Priority Data

Aug. 16, 1995 (IS) .................................................... 4303

(51) Int. Cl.$^7$ .......................... B29D 30/60; B60C 11/14
(52) U.S. Cl. ..................... 156/96; 152/209.4; 156/114; 156/117; 156/128.6; 156/130; 156/397; 156/909
(58) Field of Search ........................... 156/96, 114, 117, 156/128.1, 128.6, 129, 130, 394.1, 397, 405.1, 406.4, 909; 152/209.4, 210

(56) References Cited

U.S. PATENT DOCUMENTS

| | | | |
|---|---|---|---|
| 1,175,624 A | * | 3/1916 | Fawkes ....................... 156/114 |
| 1,290,576 A | * | 1/1919 | Kendall ....................... 152/211 |
| 2,513,064 A | | 6/1950 | Solomon et al. ............ 152/211 |
| 2,672,910 A | | 3/1954 | Corson ........................ 152/211 |
| 3,177,918 A | * | 4/1965 | Holman ....................... 156/117 |
| 4,155,789 A | * | 5/1979 | Wireman et al. ............ 156/130 |

FOREIGN PATENT DOCUMENTS

| | | |
|---|---|---|
| DE | 2726690 | 12/1977 |
| DE | 4025459 | 2/1991 |
| EP | 0442155 | 8/1991 |
| EP | 0454025 | 10/1991 |
| WO | WO94/25298 | 11/1994 |

* cited by examiner

Primary Examiner—Geoffrey L. Knable
(74) Attorney, Agent, or Firm—Jacobson Holman PLLC

(57) ABSTRACT

A method and equipment for mixing hard granules into tire tread bodies and into sundry rubber strips and tread stock. Rubber stock is extruded into tread bands of a suitable shape which are rolled under control, in a suitable thickness and number of layers, in a circular process over a pre-treated tire, or other object. The tire is subsequently patterned and vulcanized. The hard granules are distributed according to a predetermined configuration onto at least part of the surface of the extruded rubber tread band before the next layer is rolled in a circular process onto the pre-treated tire, using dedicated equipment so that the granules will be mixed into the patterned wearing surface of the tire after profiling and vulcanization.

9 Claims, 6 Drawing Sheets

METHOD AND EQUIPMENT FOR MIXING HARD GRANULES FOR TIRE TREADS

This is a Continuation of application Ser. No. 09/029,012 filed Apr. 17, 1998 now abandoned, which was the National Stage of International Application No. PCT/US96/0005 filed Aug. 15, 1996.

TECHNICAL FIELD

The invention concerns a method and equipment for mixing hard granules into tyre tread bodies and furthermore into sundry rubber strips and tread stock, whereby rubber stock is extruded into tread bands of a suitable shape which are rolled under control, in a suitable thickness and number of layers, in a circular process over a pre-treated tyre or other material (object) which is subsequently patterned and vulcanised.

Vehicle tyres consist, broadly speaking, of a fibre-reinforced carcass (bound with wire or rope) which forms the inner layer of the tyre, and an outer wearing layer which is made of vulcanised rubber or comparable material and is profiled into a pattern over the reinforced tyre carcass.

Tyres are manufactured according to the above specification but retreading of them is also a familiar process. When the pattern of the wearing surface (the tread) has worn down so far that is ceases to serve its function, the remainder of the wearing surface is buffed and a new tread is placed over the fibre-reinforced carcass. One way in which this is done is by overlaying the circular process of the tyre carcass with an extruded rubber tread band of a suitable thickness, which is then profiled into a new pattern and vulcanised.

The role of the outer layer of the tyre is to form a resistant and wearing surface against the surface on which the vehicle is driven. Many methods are known for increasing tyre resistance and reducing skidding of vehicles on a slippery surface such as ice or snow. Particular mention should be made of spikes which are driven into the tyres after conventional manufacture, and snow chains.

BACKGROUND

In recent years and decades, ideas have been proposed for mixing and/or anchoring of various types of material into or onto the wearing surface of tyres.

Methods are known for mixing hard granules into the tread body of a tyre in order to increase its resistance on a slippery surface, in particular snow and ice. The U.S. Pat. No. 2,672,910 from 1948 describes the production of a tyre in which coated hard granules are mixed with the raw rubber which is used for production of the tyre. By coating the granules improved bondage is obtained with the rubber body.

Furthermore, methods have been developed for re-treading. A worn tyre is pre-treated (buffed) to prepare the rolling of a new tread body onto it. A new layer of rubber is wrapped around the circular process of the tyre and then profiled into a pattern, cf. German Patent DE 4.025459 A1, which concerns general re-treading of used tyres.

European Patent Applications EP 0 454.025 A1 and EP 442.155 A1 furthermore describe methods for production of tyres and/or re-treading, whereby coated hard granules are mixed into the raw rubber before extrusion and rolling on the pre-treated tyre.

The above patents describe methods and equipment for production of treads and tyres. They describe the mixing of hard granules into the tread body of the tyres in order to increase the tyre's resistance against the driving surface and to reduce vehicle sliding on ice or snow.

None of the aforementioned methods or equipment for mixing hard granules has achieved widespread acceptance, as a result of shortcomings of these methods in the production process.

The disadvantage of these methods has been the cost involved in mixing the hard granules into the rubber body before extrusion, for reasons including substantial wear and tear to the equipment.

The required amount of hard granules must be considered excessive if they are mixed with the entire raw material body. Nor has it proved possible to control the final location of the hard granules in the wearing surface of the tyre, which must also be considered a disadvantage.

Yet another disadvantage is the inadequate bondage yielded between the fibre-reinforced carcass and the granulated tread body, since the granules show a tendency to impair the bondage between the carcass and the wearing surface. Furthermore, mixing granules into the entire rubber body is considered to reduce the flexibility of the tyre carcass.

SUMMARY OF THE INVENTION

The aim of the invention is to present a method and equipment which are at once straightforward in use and production, and economical to operate, and which also enable control to be maintained over the mixing and location of hard granules in the wearing surface of tyres. One of the major advantages of the method for which the patent is being applied is that it does not require extra labour for re-treading of tyres.

By manufacturing tyres and other treads with a mixture of hard granules, the following aims are achieved:

Increased vehicle resistance to slippery surfaces.

Reduced road wear compared with the use of spiked tyres.

Enhanced general driving properties compared with the use of spiked tyres or snow chains.

These properties have been confirmed in tests by VTI of Sweden (Swedish Public Roads Administration) and BAST of Germany (German Public Roads Administration or Bundesanstalt für Stassenwesen).

These aims are achieved by the invention's distinctive feature of distributing the hard granules according to a predetermined configuration onto at least part of the surface of the extruded rubber tread band before the next layer is rolled in a circular process onto the pre-treated tyre, using dedicated equipment so that the granules will be mixed into the patterned wearing surface of the tyre after profiling and vulcanisation.

A further distinctive feature of the invention is that the hard granules are distributed according to a predetermined configuration onto at least part of the surface of the extruded rubber tread band, thereby allowing the extent to which the tread band is covered with hard granules to be controlled, and likewise the distribution of the granules into predetermined parts of the patterned and vulcanised tyre.

A further distinctive feature of the invention is that 0.01 to 0.1 gm of hard granules are distributed onto each square centimeter of rubber tread band which is covered with hard granules, with each granule of the diameter range 1–3 mm, particularly 1.5–2.0 mm.

Furthermore, a distinctive feature of the invention is that the hard granules are distributed according to a predetermined configuration onto the part of the surface of the extruded rubber tread band which, after rolling onto the pre-treated tyre carcass surface, forms the outer surface of the vulcanised and patterned tyre, and that the granule distribution equipment is located after the extruder in the production process and above the extruded rubber tread band, and in front of the tyre, and that the granules are distributed onto the rubber tread band before it is rolled on to the tyre.

The equipment is unique insofar as it consists of a funnel into which the hard granules are fed before distribution, and a feeder (revolving rubber-clad cylinder which feeds a suitable quantity of granules from the funnel onto a track for controlling their delivery onto the rubber tread band, and the distribution device (the track) can be adjusted to control the direction and speed at which the granules are delivered onto the extruded rubber tread band and match as closely as possible the direction and speed of the band itself, and the quantity of granules fed and distributed from the funnel is controlled by a feeder door and by the speed of the cylinder, thereby controlling that the granules are located on the tread band at a suitable density.

Much research has been conducted into the properties of tyres which are produced using the new method described above. Very thorough testing by BAST of Germany has convincingly demonstrated that road wear caused by tyres with mixed hard granules is greater than that caused by "winter tyres" but considerably less than the average road wear caused by 9 types of spiked tyre. Tests at BAST revealed that, setting road wear caused by nailed tyres at a reference point of 100%, wear caused by the above-mentioned hard-granule tyres measures 7% and that caused by winter tyres 2%.

Tests conducted by the Swedish Public Roads Administration of Linkoping show that hard-granule tyres clearly displayed much better road-holding properties under slippery conditions than the same type of tyre without hard granules. The tests also showed that hard-granule tyres generally display better road-holding properties than spiked tyres when rolling along the road surface. This is a particular advantage, for example, on bends and where anti-braking systems prevent the wheels from locking completely.

In all likelihood, many types of hard granules may be used for mixing. The trials which have been made have used granules of SiC (silicon carbide, "carborundum") and $Al_2O_3$ (aluminium oxide), which have been coated with familiar bonding materials and/or adhesives.

BRIEF DESCRIPTION OF DRAWINGS

The invention is described in more detail below, with reference to the enclosed illustrations where.

DETAILED DESCRIPTION OF THE PREFERRED EMBODIMENT

Figure 1:
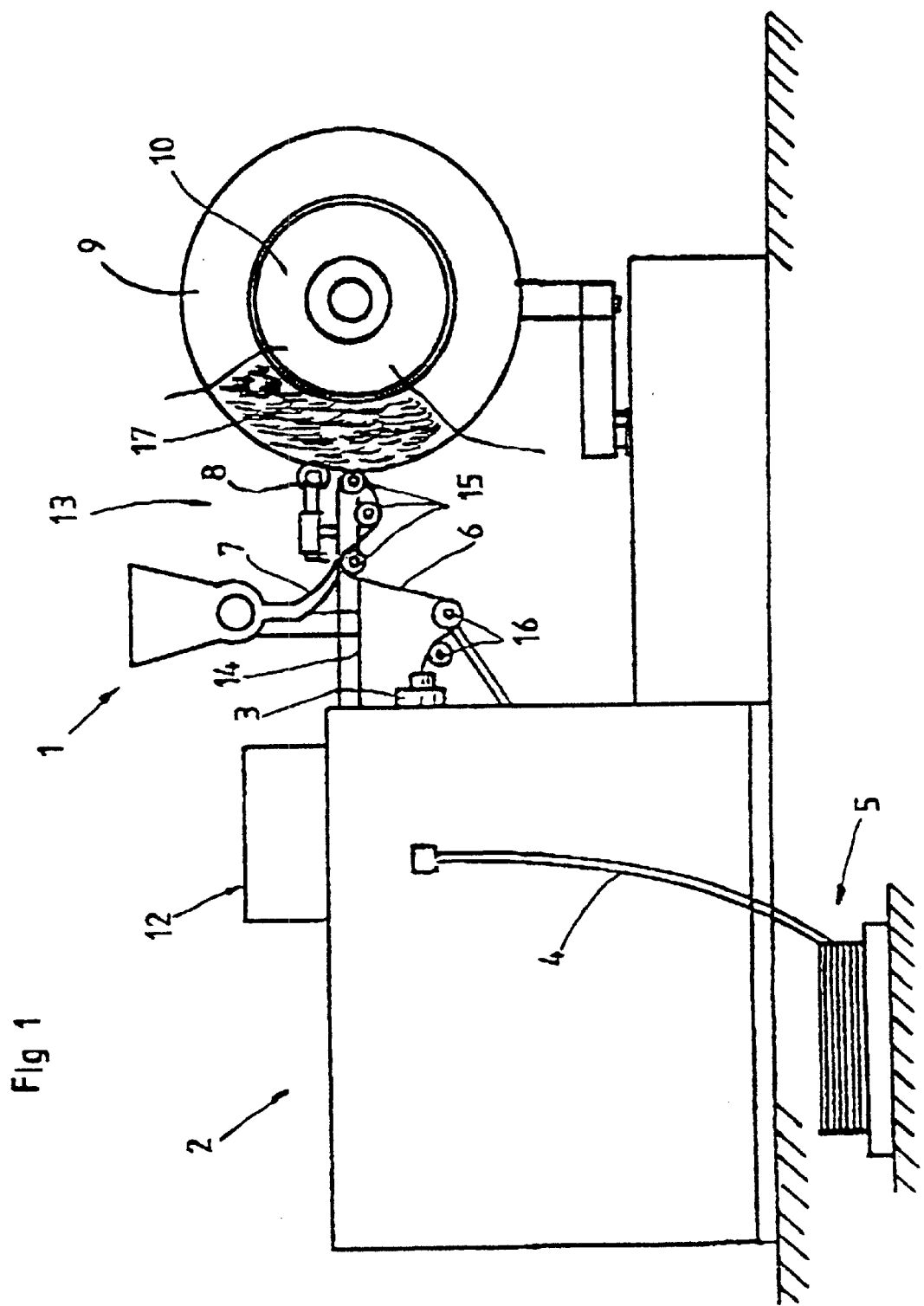
FIG. 1 shows equipment for retreading of tyres and for mixing of hard granules into the treads, side view.
Figure 2:
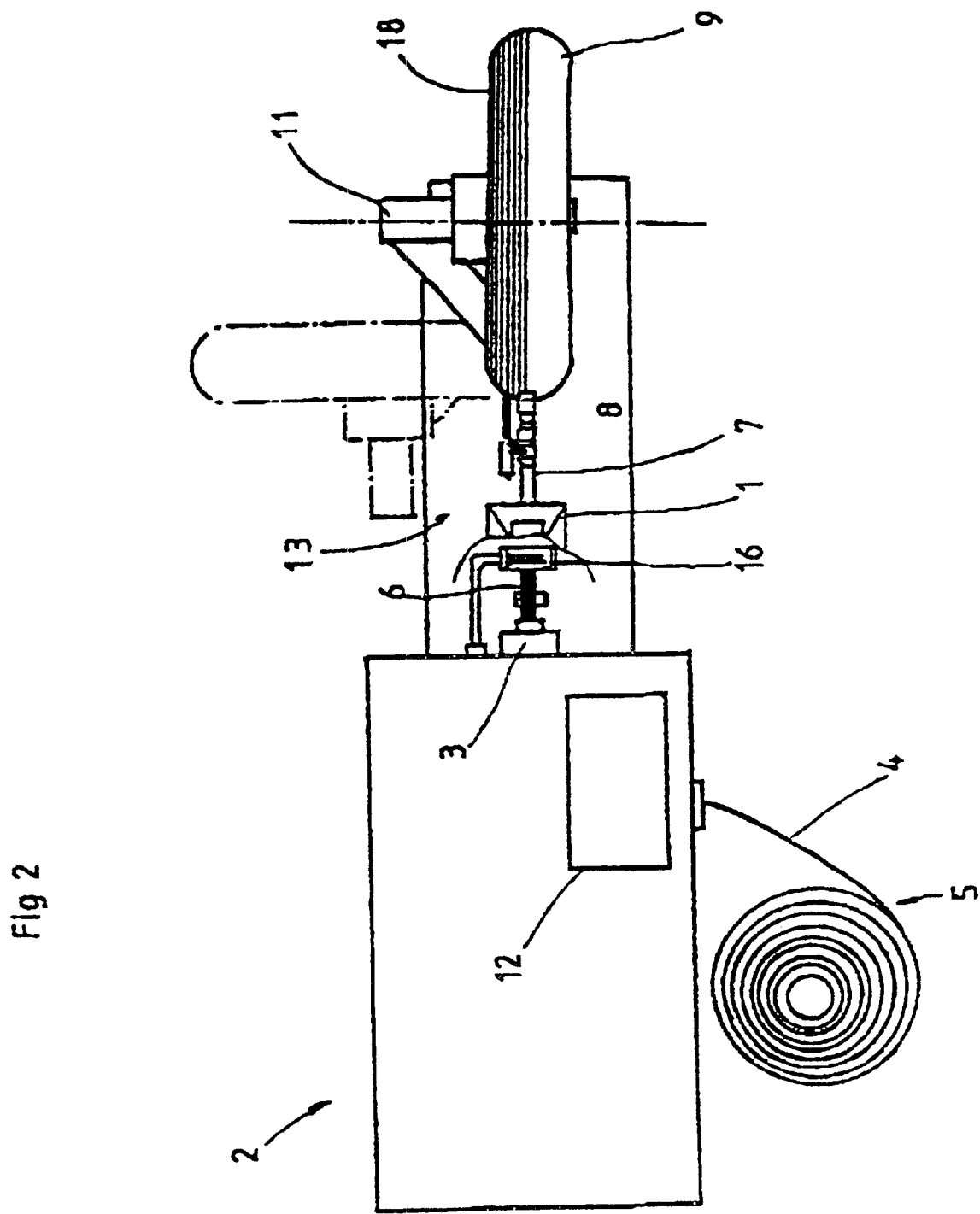
FIG. 2 shows equipment for retreading of tyres and for mixing of hard granules into the treads, top view.

FIGS. 1 and 2 show conventional equipment which is used for treading of tyres. FIG. 1 shows a side view of the equipment, and FIG. 2 a top view. The equipment has been supplemented by the addition of a device for mixing of hard granules into the tread body. The equipment consists of an extruder (2) which produces a thin, elastomer rubber band (6) from the rubber stock (5). The rubber stock is drawn in a thick band (4) into the extruder (2) where it is processed and extruded through a shaping head (3) in the form of a relatively thin extruded rubber tread band (6). The tread band is drawn onwards over and under control wheels (16) and onwards again over and under a second pair of control wheels (15) until it is eventually rolled onto the pre-treated tyre (9, 17). Part of the control wheel configuration (15) is or may be assembled from many thinner discs, like the pressure roller (8) which presses the rubber tread band (6) onto the tyre. The tyre is attached to a device which, on the one hand, rotates the tyre around its axis (11) at the same time as the tread band is rolled in a circular process onto the tyre, and, on the other hand, rotates slightly about a vertical axis, which shifts the alignment of the pre-treated tyre relative to the rolling device (13). Thus it is possible to roll the rubber tread band (6) in layers which overlap in the circular process of the entire tyre (18). Between the extruder (2) and the tyre (9) a device (1) is fitted for mixing of the hard granules and/or applying them to the tread band. This device (1) is attached to an arm (14) which extends from the same extruder (2) and holds some of the control wheels (15) and pressure roller (8). Of course, the device may also stand alone, its function is to distribute hard granules onto the tread band before it is rolled onto the tyre, or at any stage before the next layer of tread band is rolled on top of it (see FIGS. 7 and 8).

Figure 3:
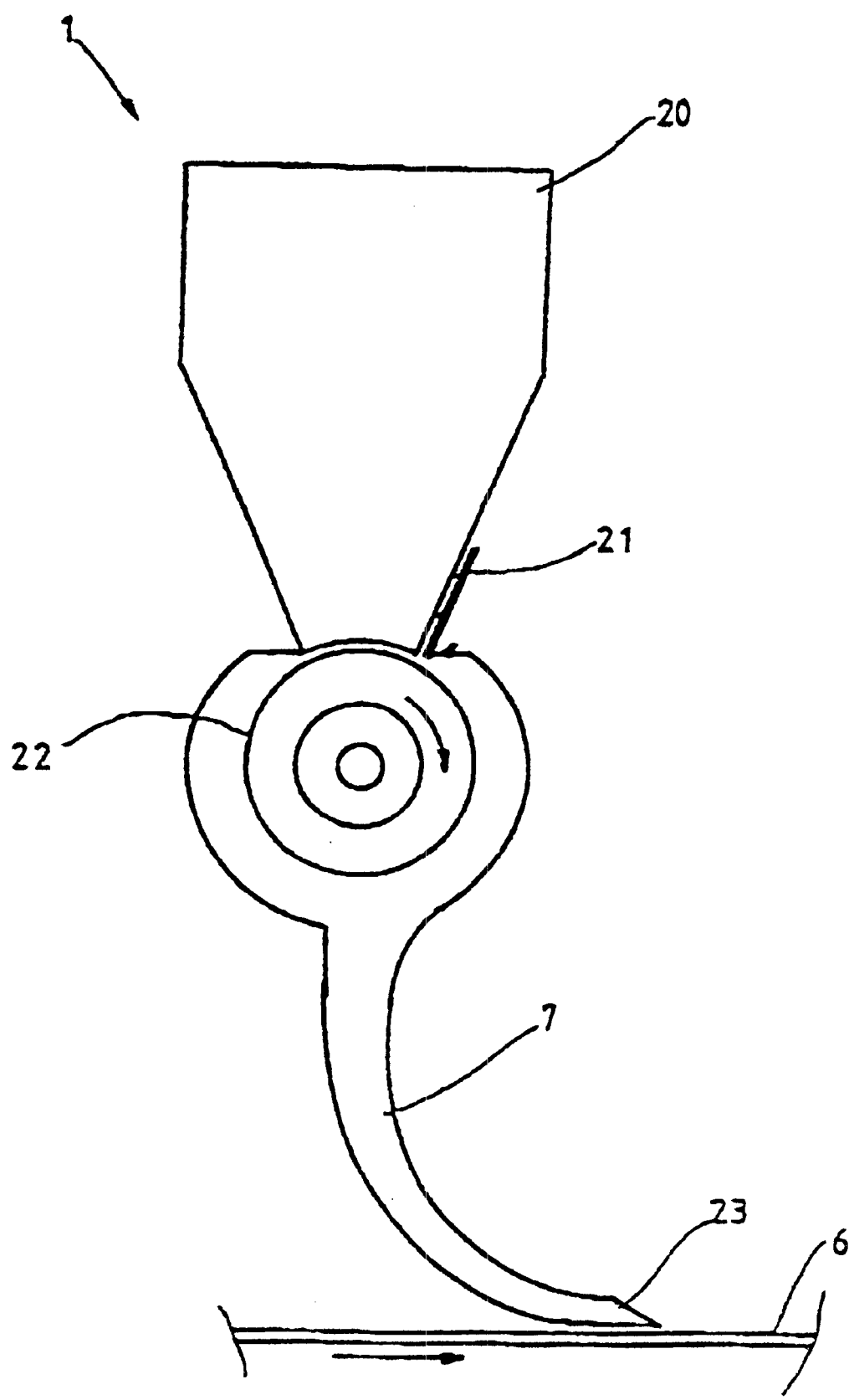
FIG. 3 shows details of the equipment for mixing and distribution of hard granules into the treads.

FIG. 3 shows the device (1) whose function is to apply or mix the hard granules into or onto the rubber tread band (6). The device consists of a funnel (20) into which the hard granules are fed before distribution, and a feeder (21, 22) which feeds a controlled quantity of hard granules from the funnel. In its simplest form, the feeder is a revolving cylinder (22) which is located directly below the funnel (20) and pulls out the lowest granules from the funnel under the door (21), or a similar device for controlling the amount fed through. The cylinder transports the granules until they drop into the control track (7), which curves in the direction of the tread band (6), and then to the distributor head (23) at the end of the track which controls the application of the hard granules to the tread band.

Figure 4A:
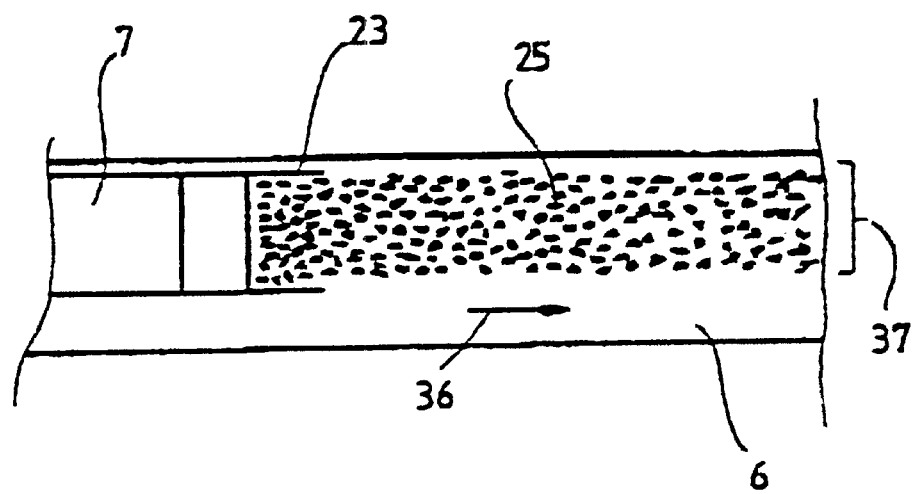
FIGS. 4a and 4b shows details of the track which controls the delivery of the hard granules onto the rubber tread band.
Figure 4B:
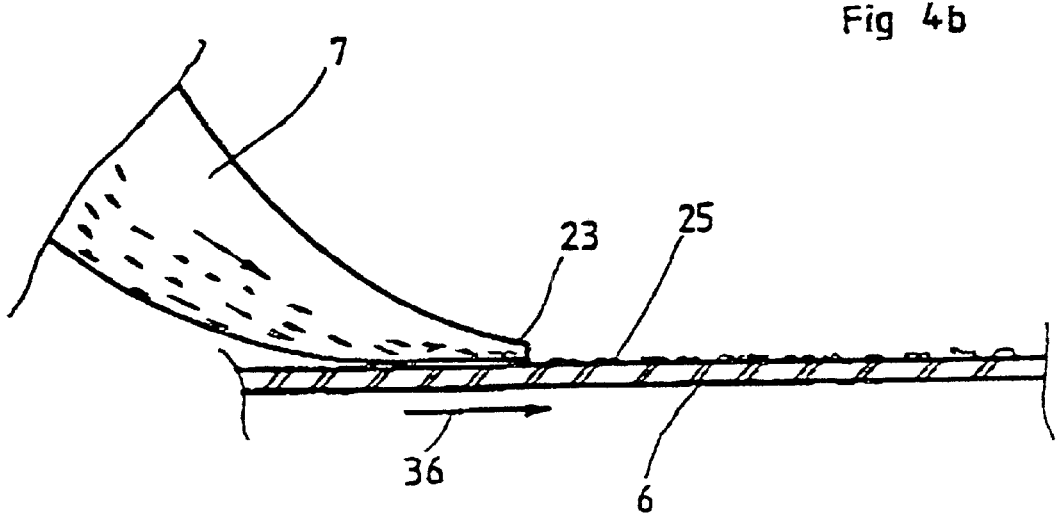

FIGS. 4a and 4b show details of the application of the granules to the tread band. The tread band (6) moves lengthwise (36) and at the same time the granules (25) pass out of the distribution head (23) of the track (7), at a speed synchronised as closely as possible to that of the rubber tread band (6). The size (width) and exact location of the distribution head (23) controls the application of the granules, so that they can be applied to a section (37) of the tread band as shown, or to all of it.

Figure 5:
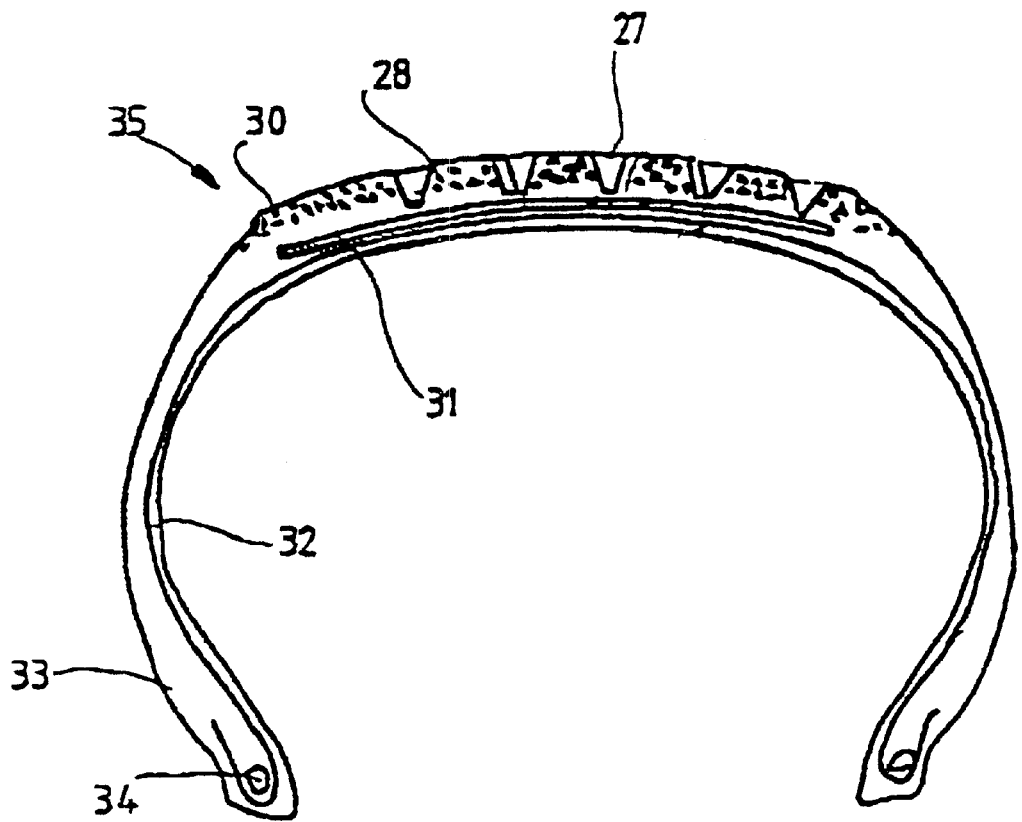
FIG. 5 shows a cross-section of the tyre with hard granules mixed into the outermost layer of the tread.

FIG. 5 shows a cross-section of the vulcanised and patterned tyre (35) and the location of the hard granules (25) in the tread (27). The granules are embedded in the outermost part (28) of the rubber overlay.

Figure 6:
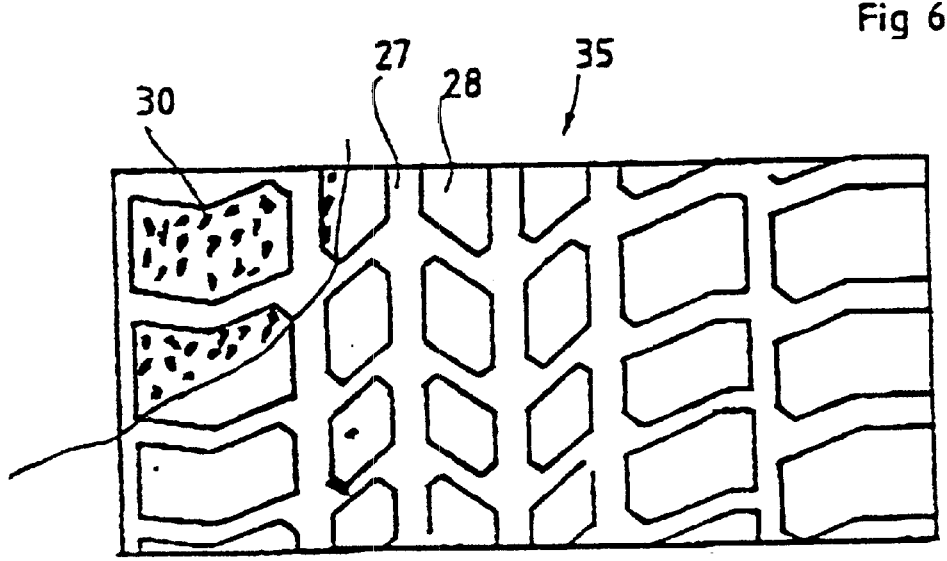
FIG. 6 shows the tyre pattern according to FIG. 5, top view.

FIG. 6 shows how the granules (25) lie in the pattern (28) of the tyre (35).

Figure 7:
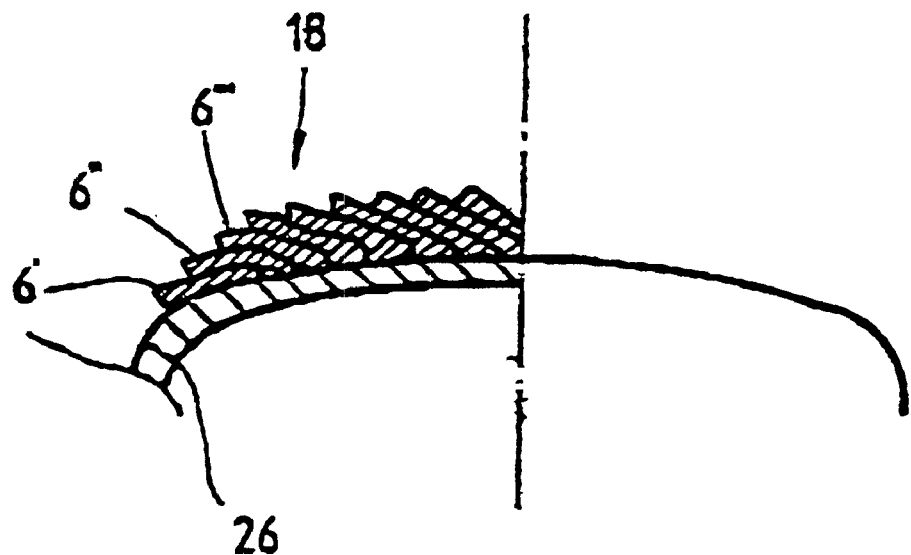
FIG. 7 shows details of the rolling of the rubber tread band under the tyre treading process.

FIG. 7 shows how the circular rubber tread band (18) is rolled in layers (6', 6", 6'") and onto the pre-treated tyre carcass (26). Each layer partly overlaps with the next, depending upon the way that the tread band is rolled on the circular process of the tyre.

Figure 8:
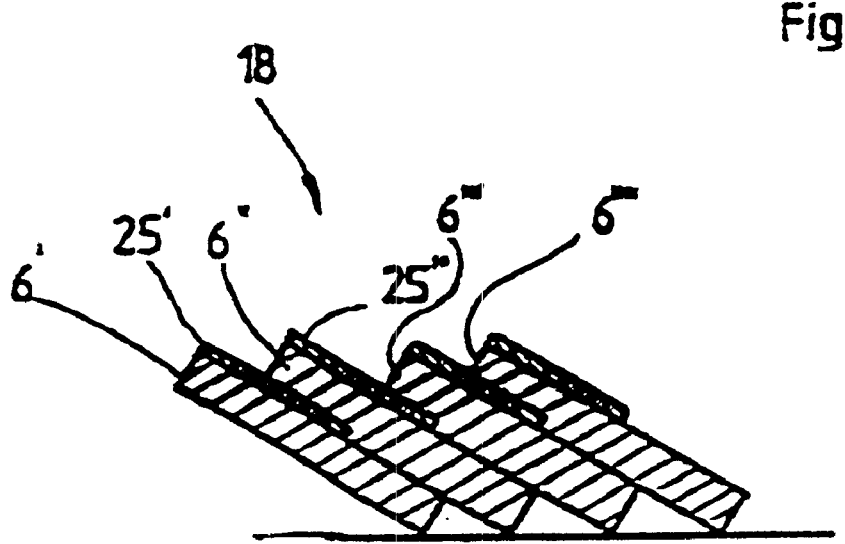
FIG. 8 shows details of the rolling of the rubber tread band (6) under the tyre treading process and the location of the hard granules (25) between the layers of the rubber tread band.

FIG. 8 shows details of the rolling of the rubber tread band (18), where each layer partly overlaps with the next (6', 6", 6''', 6''''), and furthermore the application of the hard granules between the layers of the tread band (25', 25" . . . ).

The invention described above is not confined to precisely those details which have been specified, but can be elaborated upon in many ways without deviating from the central concept.

What is claimed is:

1. A method for providing hard granules into a surface layer of tire tread bodies, said method comprising the steps of:

supplying an extruded rubber tread strip from a rubber tread strip extruder, rolling said rubber tread strip onto a pre-treated tire in a predetermined number of laterally contiguous strip layers to form an outermost surface layer from a plurality of the strip layers by use of a rolling device, wherein each layer at least partly overlapping a previous rolled strip layer, distributing said granules according to a predetermined configuration onto only a section of an upper surface of said rubber tread strip before a succeeding layer of said tread strip is rolled onto the pre-treated tire, and distributing the granules by use of distributing equipment arranged in a space between the extruder and the rolling device and so arranged that the granules are distributed onto an upward facing surface of the section of the rubber tread strip allowing the granules to be located in a wearing surface of the tire after vulcanization and pattern formation.

2. The method for mixing hard granules into the surface layer of tire tread bodies, according to claim 1, further comprising distributing 0.01 to 0.1 gm of hard granules per square centimeter of rubber tread strip which is covered with hard granules.

3. The method for mixing hard granules into the surface layer of tire tread bodies, according to claim 1, wherein each granule is of a diameter range of 1.5–2.0 mm.

4. The method for mixing hard granules into a surface layer of tire tread bodies, according to claim 1, wherein each granule is of a diameter range of 1–3 mm.

5. Equipment for providing hard granules into a surface layer of tire tread bodies, said equipment comprising:

an extruder for providing and shaping a rubber stock into tread strips, a rolling device for rolling the tread strips, under control, in a suitable thickness and shape and number of layers, in a circular process, onto a pre-treated tire, so that the tread strips are rolled onto the tire carcass as the tire is turned, and distributing equipment for distributing the granules, being positioned in a space between the extruder and the rolling device and above the rubber tread strip being extruded from the extruder, so arranged that the granules are distributed onto only a portion of an upward facing surface of the rubber tread strip allowing the granules to be located in a wearing surface of the tire after vulcanization and pattern formation.

6. The equipment for providing hard granules into a surface layer of tire tread bodies, according to claim 5, wherein the distributing equipment is positioned after the extruder in the production process and in front of the tire and before the rubber tread strip is rolled onto the tire.

7. The equipment for providing hard granules into a surface layer of tire tread bodies, according to claim 5, wherein the distributing device includes a funnel into which the hard granules are fed, and a feeder which feeds a suitable quantity of granules from the funnel onto a track to control the application of the granules onto the tread strip.

8. The equipment for providing hard granules into a surface layer of tire tread bodies, according to claim 5, wherein a distribution device is adjustable to match a direction and speed at which the granules are placed on the tread strip as closely as possible with a direction and speed of the tread strip, thereby controlling distribution of the granules onto the tread strip.

9. The equipment for providing hard granules into a surface layer of tire tread bodies, according to claim 7, wherein the funnel includes a revolving cylinder which is clad with a rubber surface for feeding and distributing granules from the funnel under a door.

* * * * *